United States Patent [19]

Plant

[11] Patent Number: 4,842,472
[45] Date of Patent: Jun. 27, 1989

[54] VEHICLE RECOVERY UNIT

[75] Inventor: John D. Plant, Long Buckby, England

[73] Assignee: PCM (Long Buckby) Engineering Ltd., Northampton, United Kingdom

[21] Appl. No.: 126,148

[22] Filed: Nov. 30, 1987

[30] Foreign Application Priority Data

Dec. 1, 1986 [GB] United Kingdom ............... 8628640

[51] Int. Cl.$^4$ ............................................. B60P 3/12
[52] U.S. Cl. ................................. 414/563; 280/402; 414/686
[58] Field of Search ................ 414/563, 686; 280/402

[56] References Cited

U.S. PATENT DOCUMENTS

| 3,951,280 | 4/1986 | Peck ................................ 414/563 |
| 4,149,643 | 4/1979 | Skala . |
| 4,152,006 | 5/1979 | Dunlap ........................ 414/563 X |
| 4,383,793 | 5/1983 | Weir ................................. 414/686 |
| 4,509,768 | 4/1985 | Haug ........................... 414/686 X |
| 4,611,968 | 9/1986 | Casteel . |
| 4,634,447 | 1/1987 | Hamman ........................... 414/563 |
| 4,700,852 | 10/1987 | Mjöberg ..................... 414/563 X |
| 4,708,358 | 11/1987 | Gehman et al. ................. 280/402 |
| 4,761,111 | 8/1988 | Brown .............................. 414/563 |

FOREIGN PATENT DOCUMENTS

| 933792 | 8/1963 | United Kingdom . |
| 1288444 | 9/1972 | United Kingdom . |
| 1355285 | 6/1974 | United Kingdom . |
| 2061193 | 5/1981 | United Kingdom . |
| 2120620 | 12/1983 | United Kingdom . |

Primary Examiner—Robert J. Spar
Assistant Examiner—Robert S. Katz
Attorney, Agent, or Firm—Shlesinger & Myers

[57] ABSTRACT

A vehicle recovery unit is disclosed comprising a first boom (9) which is pivotally mountable on the fifth wheel (6) of a tractor unit (1), beneath which first boom (9) is pivotally mounted a second boom (11). The second boom (11) is pivotally moveable with respect to first boom (9) by a piston and cylinder arrangement (13). The second boom (11) may be secured to a vehicle to be recovered (3) by a locking pin (25) a chain under tension (26) and a load bearing member (27) so that the second boom (11) is rigidly secured to the lorry (3). When in use, the attachment of the recovery unit (2) to the lorry (3) is rigid and the combined lorry (3) and vehicle recovery unit (2) are pivotable only about the fifth wheel (6) of the tractor unit (1). The vehicle recovery unit (2) is free standing by legs (20) so that the tractor unit (1) may be detached from the recovery unit (2) and driven away to leave the recovery unit (2) free standing.

23 Claims, 2 Drawing Sheets

VEHICLE RECOVERY UNIT

DESCRIPTION OF INVENTION

Improvements in or relating to vehicle recovery.

The present invention relates to vehicle recovery, especially to a vehicle recovery unit for use in recovery of inoperative vehicles, and more particularly to a vehicle recovery unit which may be mounted on a tractor unit and which may be used in recovery of large vehicles without placing excessive strain upon the rear axle of any vehicle upon which the recovery unit is positioned.

There are several forms of vehicle recovery units currently in use. All are mounted on or form a part of recvery vehicles and involve connecting a broken-down vehicle to the recovery unit in such a way as to lift the front, e.g. driven, wheels of the broken-down vehicle off the ground to allow the broken-down vehicle to be pulled by its freely-rotating rear wheels alone and thus be transported to a suitable place for repair.

Relatively small vehicles such as cars and vans may be readily transported by means, for instance, of a crane mounted on a trailer or tractor unit. However, greater problems arise in respect to the recovery of large vehicles such as coaches and, more particularly, lorries, especially lorries which are laden with goods. Further problems have arisen as it has been discovered that the original practice of attaching the recovery unit to the front bumper, or environs, of the vehicle to be recovered causes damage to the vehicle to be recovered and, accordingly, most vehicle recovery units at present are attached to the chassis of the vehicle to be recovered at a point below or on the front axle of the vehicle to be recovered.

One form of vehicle recovery unit used presently includes a main boom extending from the back of a tractor unit which main boom is pivoted about a horizontal axis, which axis extends at 90° to the centre line of the vehicle upon which the boom is mounted. The boom is pivoted by a power transmission, usually in the form of hydraulic cylinders, which transmission acts upon the boom from a fixed mounting point on the tractor unit itself. A second member extends from the main boom, in the same direction as the main boom, the second member having a centre line lower than that of the main boom. At the end of this member remote from the recovery vehicle is a protrusion which may be adjustable in an elongate fashion to extend underneath a vehicle to be recovered. This protrusion may be affixed to a point beneath the vehicle to be recovered and the front portion of the vehicle to be recovered is lifted from the ground by means of the power transmission moving the main boom away from the recovery vehicle about the pivot point. The second member is pivoted to the main boom to allow for compact storage during transport when not attached to a recovered vehicle.

Among the problems inherent in this system, is the problem that the act of lifting and towing the vehicle to be recovered transfers a great deal of the weight of the vehicle being towed to the towing vehicle's rear axle, which causes the towing vehicle to pivot about the rear wheel. This in turn tends to lift the front wheels of the towing vehicle off the road and so causes a progressive loss of steering and also causes the rear axle of the recovery vehicle to be overloaded sometimes by as much as 100%. This overloading of the rear axle has been a problem in the art for over twenty years. A further problem experienced in the art at present is that the towed vehicle is mounted on the vehicle recovery equipment in a position close to the rear of the recovery vehicle, which position restricts the turning ability of the combination of the recovery vehicle and the towed vehicle. This problem arises because the towed vehicle is pivoted at the point of attachment to the vehicle recovery equipment. This pivoting of the recovered vehicle with respect to the vehicle recovery equipment further causes the problem that, with movement of the towed vehicle with respect to the vehicle recovery equipment, chains or other attaching devices connecting the towed vehicle to the equipment may either work loose or be overloaded, often to breaking point, which is, obviously, dangerous.

U.S. Pat. No. 4149643 discloses a vehicle recovery apparatus comprising an elongate boom which may be attached to the fifth wheel of a tractor unit which may be used for vehicle recovery. On the end of the boom remote from the vehicle recovery tractor unit is positioned means for attaching the boom to the fifth wheel of a vehicle to be towed, together with lifting means which may lift the rear wheels of the vehicle to be towed off the ground. Although this Specification discloses means for lifting and towing vehicles which causes the weight of the towed vehicle to be transferred to a point between the front axles of the recovery vehicle, the boom itself would have to be lifted onto the recovery vehicle either by a team of men or with lifting apparatus. Furthermore, this lifting of the boom onto the recovery vehicle would have to take place at the site of recovery because the length of the boom would have to be such that, when not attached to a vehicle being towed, it would form a protrusion extending illegally beyond the back of the recovery vehicle. Finally, the vehicle recovery equipment of U.S. Pat. No. 4,149643 is attached to the vehicle to be recovered by means of chains, the equipment being pivoted at the point of attachment to the towed vehicle thus causing possible overload to the attachment means.

According to the present invention, there is provided a vehicle recovery unit for attachment to a recovery vehicle, which unit comprises a first boom, mountable on the rear portion of the vehicle for pivotal movement in a vertical plane, which boom, when mounted, extends essentially horizontally beyond the rear of the vehicle, and a second boom, pivotally attachable to the first boom, to the rear of the recovery vehicle when in position, the second boom comprising, at the end remote from the recovery vehicle when in position, means for attaching the second boom to the chassis of a vehicle to be recovered, and power transmission means for effecting relative pivotal movement of the second boom with respect to the first boom.

Preferably, the power transmission means comprises a piston and cylinder arrangement, most preferably hydraulically operated. Most preferably the power transmission means is adapted to pivot the second boom through 90° so that the second boom extends substantially normally to the first boom in order to render the unit more compact when being transported without towing a vehicle to be recovered.

Most preferably, the vehicle recovery unit comprises means for fixing the vehicle to be recovered relative to the second boom during lifting of the vehicle to be recovered and to fix the position of the towed vehicle during towing.

Preferably the second boom comprises a telescopic attachment at the end remote from the recovery vehicle, which telescopic attachment has at the end remote from the second boom means for attaching the telescopic attachment to the chassis of the vehicle to be recovered, the telescopic attachment being adapted to be extended to a point beneath the vehicle to be recovered, where the attachment means are substantially level with the point of attachment on the chassis of the vehicle to be recovered. Preferably, the attachment means comprise a chain under tension. More preferably, the attachment means further comprises a pin for locking the telescopic attachment to the front axle of the vehicle to be recovered.

Preferably, the second boom further comprises means for rigidly fixing the position of the second boom with respect to the first boom during towing of the vehicle to be recovered.

Preferably, the first boom comprises means for fixing the position of the first boom relative to the recovery vehicle when the unit is in position during transport of the recovery unit when not towing a vehicle. More preferably, the means for fixing the position of the first boom relative to the recovery vehicle comprises a bearing foot which may be extended from a cylinder attached to a first boom downwardly to the rear of the recovery vehicle. Most preferably the cylinder may be extended outwardly in a direction substantially normal the first boom to a point where the cylinder further extends beyond the sides f the recovery vehicle, thus allowing the bearing foot to be extended to the ground, or alternatively allowing an extension to the bearing foot to be fitted, thus providing a foot bearing the load of the recovery unit on the ground, so allowing the recovery vehicle to be detached from the vehicle recovery unit without altering the position relative to the ground, of the vehicle recovery unit.

According to the second aspect of the present invention, there is provided a vehicle recovery unit adapted to be releasably mounted on a recovery vehicle, the vehicle recovery unit being further adapted to stand freely upon release from the recovery vehicle. Preferably, such a unit may be mounted on the fifth wheel of a tractor unit. In a preferred embodiment of this invention the vehicle recovery unit comprises a pair of rams, one positioned on either side of the unit at the end of the unit which is connectable to the recovery vehicle, the rams being extendable toward the ground alongside the recovery vehicle to allow the recovery vehicle to be detached from the unit without the unit altering position. Alternatively, the vehicle recovery unit may comprises a plurality of legs which may be releasably mounted to the unit to allow the unit to remain in position when the recovery vehicle has been detached from the unit.

According to the third aspect of the present invention, there is provided a vehicle recovery unit which is mounted on the fifth wheel of a tractor unit and wherein, when attached to a vehicle to be recovered, the attachment between the unit and the vehicle to be towed is substantially rigid and the recovery unit pivots solely about the fifth wheel of the tractor unit.

In all aspects of the invention, it is envisaged that such attachments as, for example, tool lockers, oil tanks, power packs and hazard beacons, may be mounted directly on or be integral with the vehicle recovery unit, preferably with a first boom.

In all aspects of the present invention, it is envisaged that the vehicle recovery unit will be mounted at a point on the recovery vehicle between the front and rear axles of the recovery vehicle.

For better understanding of the present invention, and to show how the same may be put into effect, reference will now be made, by way of example, to the accompanying drawing, in which the figures show a vehicle recovery unit according to the present invention.

Figure 1:
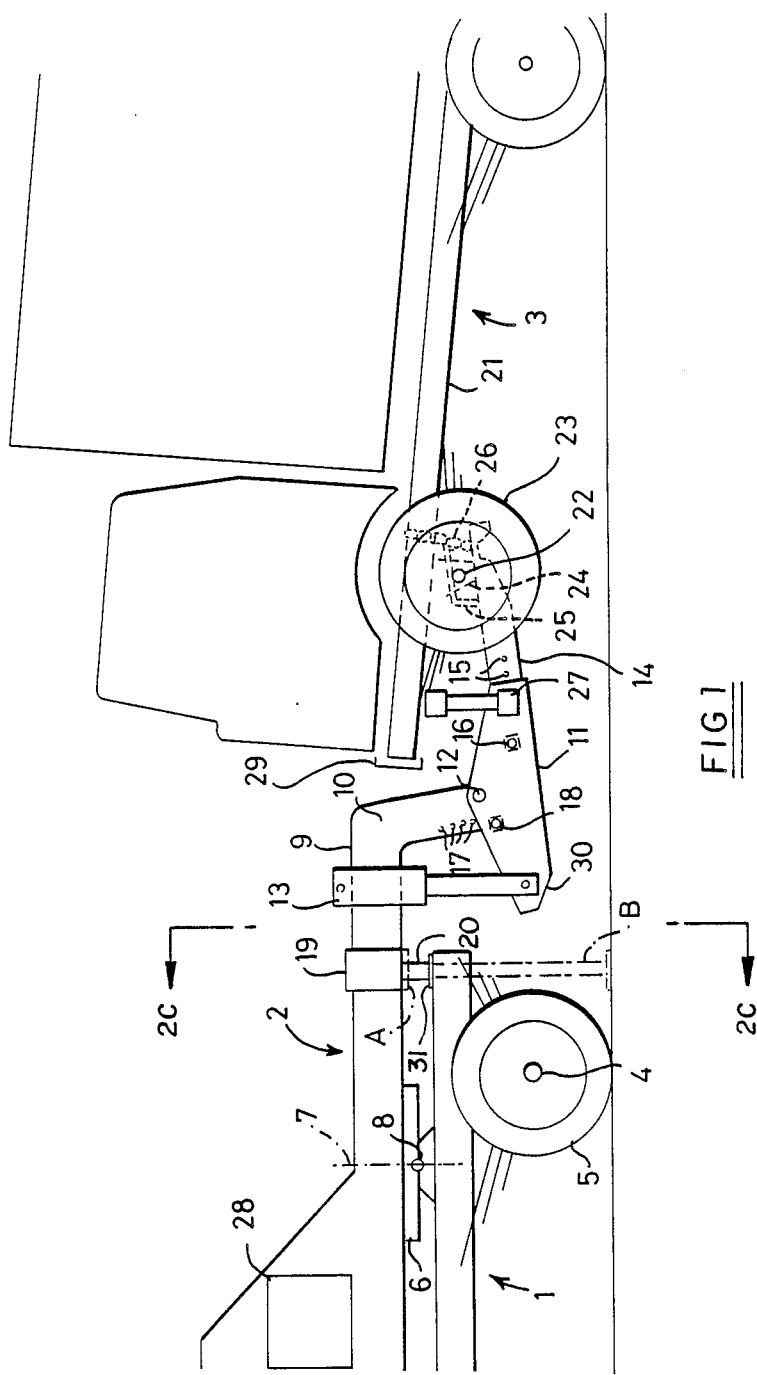
FIG. 1 is a schematic side view of the present invention.

Referring now to the drawings, there is shown a recovery vehicle 1 upon which is mounted a vehicle recovery unit 2 according to the present invention, upon which vehicle recovery unit 2 is mounted a vehicle to be towed, in this case a lorry 3.

The recovery vehicle 1 is a tractor unit, of the type used for towing containers such as are used in articulated lorries. The tractor unit comprises a front cab (not shown), front axle bearing wheels (not shown), a rear axle 4, bearing wheels 5 and a fifth wheel 6 mounted towards the rear of the recovery vehicle.

The vehicle recovery unit 2 is mounted on the fifth wheel 6 by means of a standard connection, which standard connection allows the vehicle recovery unit 2 to pivot in the horizontal plane around axis 7 and pivot in the vertical plane around pivot point 8.

The vehicle recovery unit 2 comprises a first boom 9 which is mounted on the fifth wheel 6 and extends beyond the rear of the vehicle 1. Behind the rear of the vehicle 1 the boom 9 is angled down into a section 10 which extends towards the ground at an angle of approximately 80° to the main part of the boom 9. At the end of the section 10 of the first boom 9 is located a second boom 11. This second boom 11 is pivotally mounted, on the end of section 10, about pivot point 12. A piston and cylinder arrangement 13 connects the horizontal section of the first boom 9 with the one end of the second boom 11 which is nearest the vehicle 1. Within the other end of the second boom 11 is slidably mounted a telescopic extension 14. Within this telescopic extension 14 are located securing holes 15 and the telescopic extension 14 may be secured within the second boom 11 by means of a pin 16 which is extended through second boom 11 and an appropriate securing hole 15 in order to locate and fix the telescopic extension 14 with respect to the second boom 11. The first boom 9 has, located in section 10, securing holes 17 which securing holes 17 are aligned with a suitable hole in the second boom 11 through which a securing pin 18 may be passed. In this way, when the vehicle 3 to be towed has been lifted off the ground into a suitable towing position, the second boom 11 may be secured in position with respect to the first boom 9 by means of a pin 18 located through the second boom 11 and the securing holes 17.

Located on the first boom 9 between the fifth wheel 6 and the pivotally mounted cylinder and piston arrangement 13 is a second cylinder and piston arrangement 19. In this arrangement 19, the piston 20 comprises a bearing foot. This bearing foot 31 is movable from the position shown in FIG. 1 to position A, shown by dotted lines in FIG. 1, when necessary. The cylinder and piston arrangement 19 may further be extended away from the boom 9, in a normal direction to the longitudinal axis of boom 9, to a point where the cylinder and piston arrangement 19 extends beyond the recovery vehicle 1 as shown in FIG. 1C. In this position, extension legs shown by dotted position B in FIGS. 1 and 2C may be secured to the bearing foot 31 to provide legs, upon which the vehicle recovery unit 2 may rest when the recovery vehicle 1 has been released from the unit 2.

The lorry 3, which is to be towed by the recovery vehicle 1 is mounted upon the vehicle recovery unit 2 by way of attachment means located at the end of the telescopic extension 14 on the second boom 11 of the recovery unit 2. The attachment means are adapted to be attached to the chassis 21 of the lorry 3 and also to the axle 22 of the front wheel 23 of the lorry 3. The attachment means comprises axle locating yoke 24 which may be used to locate the axle 22 with respect to the telescopic extension 14, axle lock pin 25 which may be extended around the axle 22 to secure the axle with respect to the axle locking yoke 24, and a chain 26 under tension, which chain 26 secures the chassis 21 to the end of the telescopic extension 14. Finally a releasably securable compression load bearer 27 is releasably secured to the second boom 11 and bears the load of the front part of the lorry 3 and also fixes the position of the front part of the lorry 3 with respect to the second boom 11.

Finally, the vehicle recovery unit further comprises a transverse boom 28 upon which are mounted hazard, indicator and brake lights, connected to the appropriate electrical circuits of the recovery vehicle and within which boom 28 is located a tool storage space.

Figure 2A:
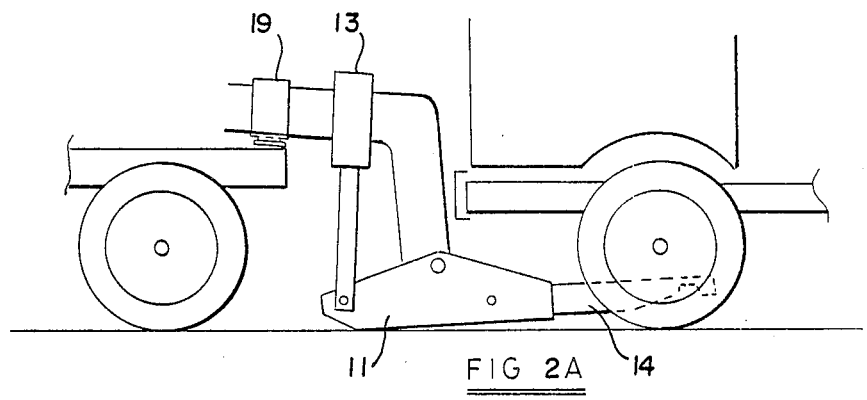
FIGS. 2A and 2B are fragmentary, schematic, side elevational views of a vehicle recovery unit according to the present invention, showing the unit engaging the ground prior to the lifting of a vehicle to be recovered.
Figure 2B:
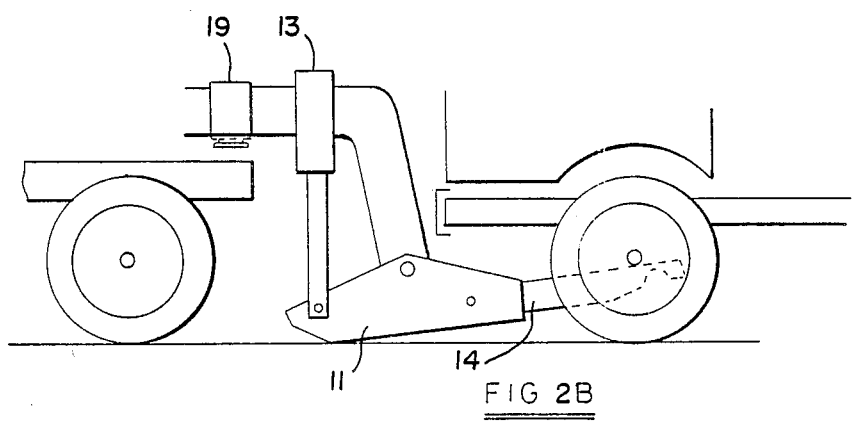
Figure 2C:
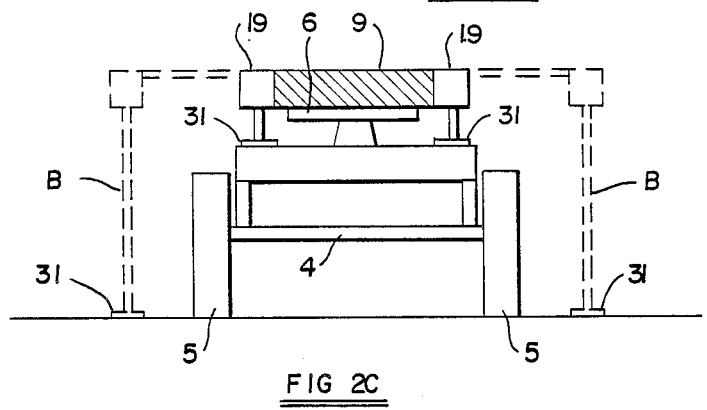
FIG. 2C is a schematic view, partly in broken lines, and partly in cross-section taken along line 2c-2c in FIG. 1 and viewed in the direction of the arrows, showing the piston/cylinder arrangements disposed adjacent and beyond each side of the recovery vehicle.

When not in use, the vehicle recovery unit 2 may be left in a suitable place, standing freely on extension legs positioned as shown by dotted lines B in FIGS. 1 and 2C. When the recovery unit 2 is required to be used, any appropriate tractor unit may be used as a recovery vehicle 1 and may be backed towards the recovery unit 2 until the fifth wheel 6 of the tractor unit 1 engages with the recovery unit 2. The recovery unit 2 may then be secured to the tractor unit 1, often by means of mere insertion of a king pin along axis 7 of the boom 9 and the fifth wheel 6. When the tractor unit is travelling to the vehicle to be recovered, the second boom 11 is pivoted about the pivot point 12 by means of full extension of the piston and cylinder arrangement 13, so that the telescopic attachment 14 is pointing directly upwards and the second boom 11 is flush with the section 10 of the the boom 9, thus making the vehicle recovery unit 2 more compact. Also when travelling without towing a vehicle, the cylinder piston arrangement 19 is retracted towards the boom 9 and the bearing foot 31 is extended downwardly to the position shown in the figure where it contacts the rear of the tractor unit 1, thereby preventing the recovery unit 2 from pivoting downwardly about the point 8 and hitting the ground. When not in use, the compression load bearer 27, the locking pin 25 and the chain 26 are released from the recovery unit 2 and stored in appropriate spaces in transverse boom 28. When the recovery vehicle 1 arrives at the vehicle to be towed 3 the cylinder piston arrangement 13 is retracted and the second boom 11 is pivoted about point 12 until the centre line of the second boom 11 is substantially parallel with the ground. The telescopic extension 14 is then slid out of the second boom 11 until the distance between the axle locating yoke 24 and the section 10 of the first boom 9 is slightly greater than the distance between the axle 22 of the lorry 3 and the front bumper 29 of the lorry 3. The recovery vehicle 1 is then reversed towards the lorry 3 to move the telescopic extension 14 beneath the lorry 3, to a point where the axle locating yoke 24 approximately corresponds to the position of axle 22. At this point, the bearing foot 31 is raised into cylinder 19 to position A shown in FIG. 1, so that the vehicle recovery unit 2 pivots about the pivot point 8 and the second boom 11 contacts the ground.

The lorry 3 is then lifted to a position where it may be secured and its position fixed with respect to the second boom 11. In this process, the piston and cylinder arrangement 13 is expandjed, causing the telescopic extension 14, which has been secured with respect to boom 11 by the location of the pin 16 in a appropriate securing hole 15, to move upwards towards the chassis 21 of the lorry 3. When the axle locating yoke 24 contacts the axle 22, the telescopic extension 14 will start to force the axle 22, and thus the front end of the lorry 3, away from the ground. To add force to this action, the end portion 30 of the second boom 11, to which end portion 30 the piston and cylinder arrangement 13 is attached, is contacted against the ground so as to use the ground as a fulcrum for the lever comprising the telescopic extension 14 and the second boom 11 as best shown in FIGS. 1A and 1B.

As the telescopic extension 14 forces the front end of the lorry 3 away from the ground so the front end of the lorry 3 will tend to move away from the second boom 11. When the front end of the lorry 3 has moved away from the second boom 11 to a distance greater than the length of compression load bearer 27, the compression load bearer 27 is mounted on the second boom 11 and the chain 26 is located around the end of the telescopic extension 14 and the chassis 21 of the lorry 3 and secured there.

The lorry 3 is then lifted to a towing position. This occurs by means of retracting the piston and cylinder arrangement 13, thus lifting end 30 of the second boom 11 away from the ground. The lever, formed by the second boom 11 and telescopic extension 14, will pivot, about the end of the compression load bearer 27 which contacts the chassis 21 of the lorry 3, so as to move the end of telescopic extension 14, remote from second boom 11, away from the chassis 21 and thus cause the chain 26 to be tensioned. When chain 26 is tensioned, and thus when the end of telescopic extension 14 remote from second boom 11 cannot be moved any further away from the chassis 21 of lorry 3, the locking pin 25 may be located about the front axle 22 of the lorry 3 to further secure the telescopic extension 14 to the lorry 3.

When the chain 26 has been fully tensioned and the locking pin 25 has been secured around the front axle 22 of the lorry 3 the piston and cylinder arrangement 13 continues to contract. However, the presence of the compression load bearer 27 resting against the chassis 21 of the lorry 3 and the presence of chain 26 tensioned around the end of telescopic extension 14 and the chassis 21 prevents the second boom 11 and the telescopic extension 14 pivoting with respect to the lorry 3. Thus, as the second boom 11 is pivoted about the point 12 by the contraction of the piston and cylinder arrangement 13, such movement is accommodated by the first boom 9, pivoting about the pivot point 8 on the fifth wheel 6 of the tractor unit 1, so as to move the first boom 9, and thus the second boom 11, upwardly, away from the ground, and so lift the lorry 3 away from the ground into a suitable towing position. When the lorry 3 has been lifted far enough away from the ground to allow the lorry 3 to be towed safely, the position of the second boom 11 is fixed with respect to the first boom 9 by means of securing a pin 18 through the second boom 11 and through an appropriate securing hole 17 located in the section 10 of the first boom 9. In this state, the lorry 3 may be towed away by recovery vehicle 1.

When the recovery vehicle arrives at its destination, the piston and cylinder arrangement 19 may be moved normally to the longitudinal axis of the boom 9, to a point which extends beyond the sides of the tractor unit 1. In this position, the bearing foot 31 may be lowered to the position shown in FIGS. 1 nd 2C and the extension shown by dotted lines B in FIGS. 1 and 2C may be added to the bearing foot 31. In this position, the apparatus formed by the vehicle recovery unit 2 and the lorry 3 is stabilised at two points, by the rear wheels of the lorry 3 and by the legs represented by B in FIGS. 1 and 2C. Thus, the fifth wheel 6 may be released from the first boom 9 and the tractor unit 1 may be driven away to leave the vehicle recovery unit 2 standing on the legs B and stabilised by the back wheels of the lorry 3. In this way the tractor unit 1 need not necessarily be out of use until such time as the lorry 3 is moved and thus the tractor unit 1 may be disconnected from the vehicle recovery unit 2 at any time. Furthermore the presence of the legs B enable a tractor unit to be driven into a position where the vehicle recovery unit 2 may be mounted upon a tractor unit 1 easily and quickly.

In the towing position, the weight of the lorry 3 is transferred by means of the first boom 9 and the second boom 11 to the pivot point 8 of the fifth wheel 6. and thus onto the tractor unit 1 at a point between the rear and front axles, thereby spreading the weight of lorry 3 across the whole of tractor unit 1 and so not overloading the rear axle 4 of the tractor unit 1. Furthermore, the turning ability of the combined recovery vehicle 1, the vehicle recovery unit 2 and the lorry 3 is improved because the vehicle recovery unit 2 is securely fastened to the lorry 3, so as to allow no movement therebetween. Thus, the combination of the vehicle recovery unit 2 and lorry 3 pivots solely about the axis 7 and the pivot point 8 of the fifth wheel 6 of the tractor unit 1, thus allowing for greater turning ability of the apparatus. Furthermore, the fact that there is no movement of the lorry 3 relative to the vehicle recovery unit 2 means that no overload is placed on the chains 26 and the locking pin 25 and, therefore, the danger of breakages thereof is significantly reduced. Finally, during process of lifting the lorry 3, no overload of the rear axle 4 of the tractor unit 1 may take place, because the lifting power is produced by the piston and cylinder arrangement 13, which does not place any direct force upon the rear axle 4 of the tractor unit 1, but merely transfers force through the pivot point 8 of the fifth wheel 6 to the entire tractor unit 1 and thus spreads force throughout the front and rear axles of tractor unit 1. It can, therefore, be seen that the present invention has many advantages over the prior art and, furthermore, solves the long felt need of prevention of overload of rear axles of recovery vehicles.

I claim:

1. A vehicle recovery unit for attachment to a recovery vehicle, which unit comprises a first boom, mountable on the rear portion of the recovery vehicle for pivotable movement about a vertical axis during normal towing and about a horizontal axis during the lifting of a vehicle to be recovered, which boom, when mounted, extends essentially horizontally beyond the rear of the recovery vehicle, and a second boom, positionable underneath the vehicle to be recovered, pivotally attachable to the first boom, to the rear of the recovery vehicle when in position, the second boom comprising at the end remote from the recovery vehicle when in position, means for attaching the second boom to the chassis of a vehicle to be recovered, power transmission means for effecting relative pivotal movement of the second boom with respect to the first boom for the lifting of the vehicle to be recovered, and means for preventing pivotal movement of the vehicle to be recovered about said attachment means, such that the position of the vehicle to be recovered relative to the second boom is fixed during towing.

2. A vehicle recovery unit as claimed in claim 1, wherein the vehicle recovery unit is releasably attachable to the recovery vehicle.

3. A vehicle recovery unit as claimed in claim 1, wherein the power transmission means comprises a piston and cylinder arrangement.

4. A vehicle recovery unit as claimed in claim 3, wherein the piston and cylinder arrangement is hydraulically operated.

5. A vehicle recovery unit as claimed in claim 1, wherein the power transmission means is adapted to pivot the second boom through 90° so that the second boom may extend substantially normally to the first boom.

6. A vehicle recovery unit as claimed in claim 1, wherein the second boom comprises a telescopic attachment, positioned at the end of the second boom which end is remote from the recovery vehicle when the vehicle recovery unit is in position.

7. A vehicle recovery unit according to claim 6, wherein the telescopic attachment comprises said attachment means for attaching the telescopic attachment to the chassis of the vehicle to be recovered, the attachment means being positioned at the end of the telescopic attachment remote from the second boom.

8. A vehicle recovery unit according to claim 6, wherein the attachment means comprises a chain under tension.

9. A vehicle recovery unit according to claim 7, wherein the attachment means further comprise a pin adapted to lock the telescopic attachment to the front axle of the vehicle to be recovered.

10. A vehicle recovery unit according to claim 6, wherein the telescopic attachment is adapted to be extended beneath the vehicle to be recovered.

11. A vehicle recovery unit according to claim 1, wherein the second boom further comprises means for fixing the position of the second boom with respect to the first boom during towing of the vehicle to be recovered.

12. A vehicle recovery unit according to claim 1, wherein the first boom comprises means for fixing the position of the first boom relative to the recovery vehicle when the recovery unit is in position and when the recovery unit is not towing a vehicle to be recovered.

13. A vehicle recovery unit according to claim 12, wherein the means for fixing the position of the first boom relative to the recovery vehicle comprises a bearing foot which is extendable from a cylinder and piston arrangement, attached to the first boom, downwardly to the rear of the recovery vehicle.

14. A vehicle recovery unit according to claim 13, wherein the cylinder and piston arrangement is movable outwardly in a direction substantially normal to the first boom, to a point where the cylinder and piston arrangement extends beyond the sides of the recovery vehicle when the unit is in position.

15. A vehicle recovery unit as claimed in claim 14, wherein an extension leg may be fitted to the bearing foot, when the cylinder and piston arrangement is moved beyond the side of the recovery vehicle, to provide a load bearing foot between the unit and the ground.

16. A vehicle recovering unit, as in claim 1, wherein:
(a) said vehicle recovery unit is releasably attachable to said recovery vehicle; and
(b) said vehicle recovery unit includes means for permitting said vehicle recovery unit to stand freely upon release from said recovery vehicle.

17. A vehicle recovery unit according to claim 16, wherein the vehicle recovery unit may be mounted on the fifth wheel of a tractor unit.

18. A vehicle recovery unit according to claim 16, wherein the vehicle recovery unit comprises a pair of rams, one ram positioned on either side of the unit, at the end of the unit which is connectable to the recovery vehicle, the rams being extendable towards the ground alongside the recovery vehicle to allow the recovery vehicle to be detached from the unit without the unit altering position.

19. A vehicle recovery unit as claimed in claim 16, wherein the vehicle recovery unit comprises a plurality of legs which may be releasably mounted to the unit to allow the unit to remain in position when the recovery vehicle has been detached from the unit.

20. A vehicle recovery unit as claimed in claim 1 further comprising at least one of: a tool locker, an oil tank, a power pack and a hazard beacon.

21. A vehicle recovery unit as claimed in claim 1 wherein the unit is intended to be mounted at a point on the recovery vehicle between the front and rear axles.

22. A vehicle recovery unit for attachment to a recovery vehicle, having a rear end, for lifting and towing a disabled vehicle having a chassis, said unit comprising:
(a) a first boom pivotally mountable on a rear portion of a recovery vehicle for pivotal movement about a horizontal axis during the lifting of said disabled vehicle and a vertical axis during normal towing;
(b) said first boom, when mounted, extending beyond the rear of said recovery vehicle;
(c) a second boom, being selectively pivotally attached to said first boom at the rear of said recovery vehicle;
(d) said second boom including a first end and a second end;
(e) means at said first end of said second boom for attaching said second boom to the chassis of the disabled vehicle;
(f) power transmission means for selectively pivoting said second boom relative to said first boom for lifting the disabled vehicle to a securing position and for positioning the disabled vehicle to a towing position;
(g) ground engaging means for permitting said second end of said second boom to engage the ground for providing support to said second boom for lifting the disabled vehicle to said securing position; and
(h) means for securing the disabled vehicle to said second boom, for preventing pivoting of said first boom about said horizontal axis when the disabled vehicle is in said towing position.

23. A method for securing a disabled vehicle to a towing position, comprising the steps of:
(a) providing a vehicle recovery unit being moutable to a recovering vehicle, said unit including a first boom being pivotable about a horizontal axis during the lifting of said disabled vehicle and a vertical axis during normal towing on said recovery vehicle and a second boom being selectively pivotally mounted to said first boom;
(b) positioning said second boom beneath the disabled vehicle;
(c) pivoting said second boom with respect to said first boom such that one end of said second boom engages the ground for support while the other end thereof lifts the disabled vehicle to a securing position;
(d) securing said disabled vehicle to said second boom for preventing pivotal movement of said first boom about said horizontal axis when one end of said second boom is lifted off the ground; and
(e) pivoting said second boom with respect to said first boom for lifting said one end of said second boom off the ground for positioning the disabled vehicle to a towing position.

* * * * *